United States Patent [19]

Nishitani et al.

[11] Patent Number: 4,602,298

[45] Date of Patent: Jul. 22, 1986

[54] VIDEO TAPE RECORDER HAVING UNINTERRUPTED TRACKING CONTROL DURING INSERT EDIT MODE

[75] Inventors: Yasuo Nishitani; Osahiko Yano, both of Osaka, Japan

[73] Assignee: Matsushita Electric Industrial Co., Ltd., Osaka, Japan

[21] Appl. No.: 492,250

[22] Filed: May 6, 1983

[30] Foreign Application Priority Data

May 7, 1982 [JP] Japan ................................. 57-76818

[51] Int. Cl.⁴ ....................... G11B 5/02; G11B 27/28; G11B 27/30
[52] U.S. Cl. ................................. 360/14.1; 360/14.2; 360/70
[58] Field of Search ............................. 360/14.1–14.2, 360/70, 77, 74.4

[56] References Cited

U.S. PATENT DOCUMENTS

| | | | |
|---|---|---|---|
| 3,549,797 | 12/1970 | Dann | 360/70 |
| 3,671,665 | 6/1972 | Kosaka . | |
| 3,974,522 | 8/1976 | Fukatsu et al. | 360/14.2 |
| 4,044,388 | 8/1977 | Metzger | 360/70 |
| 4,120,008 | 10/1978 | Metzger et al. . | |
| 4,148,082 | 4/1979 | Okada et al. | 360/77 |
| 4,237,500 | 12/1980 | Sanderson | 360/77 |
| 4,303,953 | 12/1981 | Sanderson | 360/77 X |
| 4,497,000 | 1/1985 | Terada et al. | 360/77 X |
| 4,509,083 | 4/1985 | Nakano | 360/77 |

FOREIGN PATENT DOCUMENTS

| | | |
|---|---|---|
| 2312901 | 12/1976 | France . |
| 2384320 | 10/1978 | France . |
| 2444989 | 7/1980 | France . |
| 2013939 | 8/1979 | United Kingdom . |
| 2097968 | 11/1982 | United Kingdom . |

OTHER PUBLICATIONS

Grundig-Technische Informationen, vol. 27, No. 3, 1980, pp. 111–120, Furth, DE; W. Kornhaas: "Das Band-, Kopfservo- und Spurnachführungssystem (DTF) des Video 2×4", p. 116, right-hand column, Chapter 3: Das Spurnachführungssytem DTF (Dynamic-track-following)-p. 118, right-hand column, Chapter 3.2.2.: Servo-modul 27502-021.01-p. 119, right-hand column, line 60; FIGS. 11-13.

Patents Abstracts of Japan, vol. 8, No. 33, (p-254) [1470], Feb. 14, 1984; & JP-A-58 188324 (Hitachi Seisakusho K. K.) 02-11-1983 Abstract; FIGS. 5-7.

Primary Examiner—Raymond F. Cardillo
Assistant Examiner—Wayne Young
Attorney, Agent, or Firm—Cushman, Darby & Cushman

[57] ABSTRACT

In a video tape recorder of the helical scan type having a pair of heads mounted on diametrically opposite positions of a rotary cylinder, a pilot signal is recorded through the heads on the same track with video signal during recording and edit modes. During "insert" edit modes, the video heads are alternately switched between playback and recording modes in synchronism with each half revolution of the cylinder. A tape is wound over an arcuate extent greater than a semicircle of the circumference on the cylinder so that the video heads are simultaneously in contact with the tape at different positions to record a video signal over a major portion of the track and record a pilot signal over the full length of the track. One of the heads is in a recording mode and tracing the major portion of a given track, while the other head is in a playback mode tracing a minor portion of a subsequent track where the prerecorded pilot signal is present. A tracking signal is derived from the prerecorded pilot signal.

7 Claims, 9 Drawing Figures

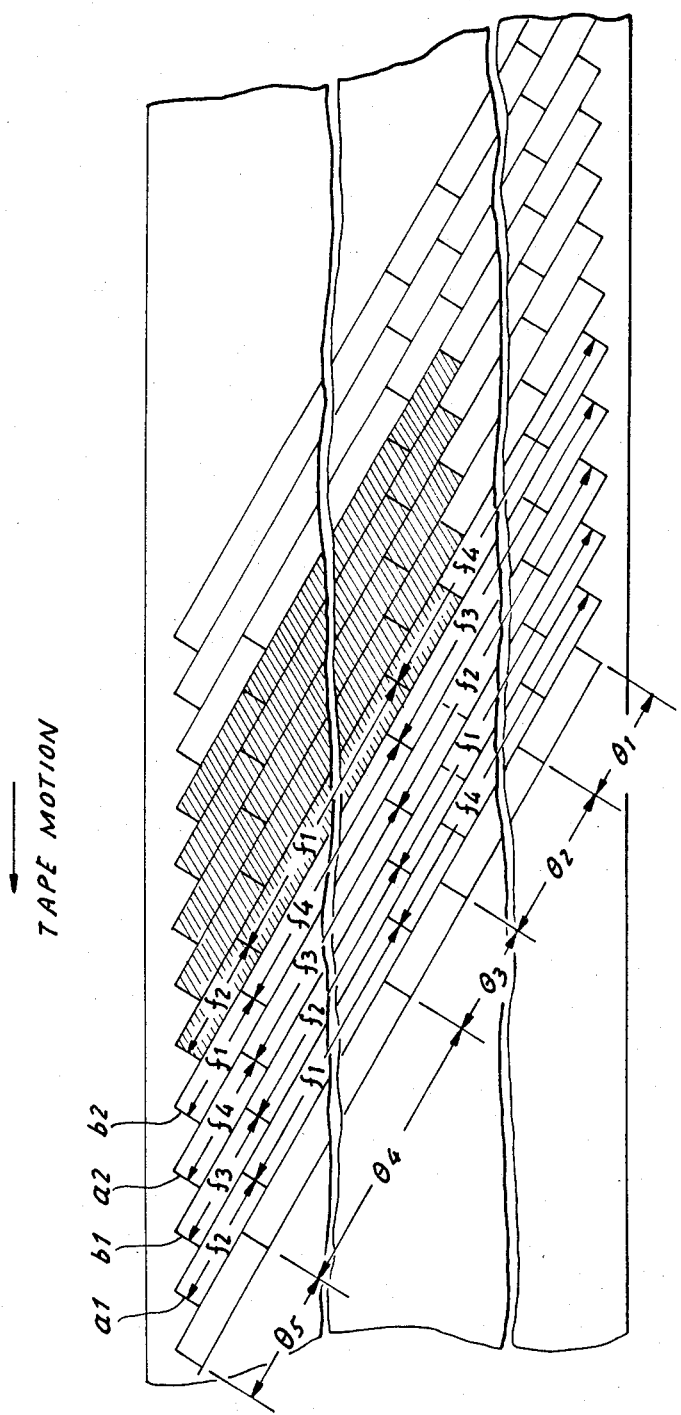

VIDEO TAPE RECORDER HAVING UNINTERRUPTED TRACKING CONTROL DURING INSERT EDIT MODE

BACKGROUND OF THE INVENTION

The present invention relates generally to video recorders, and in particular to a video tape recording and reproducing apparatus having an edit mode for inserting a new program into prerecorded material without causing disturbances during transitions at the boundaries between different programs.

In conventional video tape recorders of the helical scan type having a pair of rotary heads with which the video signal is recorded along skewed parallel tracks, a stationary head is employed for recording a tracking signal along an edge of the videotape in synchronism with the picture field of the video signal so that the recorded tracking signal corresponds in position to each oblique track. During playback modes the tracking signal is detected to generate a reference phase with which the speed of revolution of the rotary heads is compared to detect a difference between them. The transport speed of the tape is controlled in response to the detected phase difference so that the video heads are precisely kept on track. The recent tendency in video recording is toward increasing the amount of information recorded on a tape, whereby tracks are closely spaced apart and tape transport speed is decreased. It is, however, difficult to ensure continuity in the tracking signal when new material is superimposed or "inserted" into a prerecorded program by operating the apparatus in a playback mode. On reproduction of such videotapes the tracking signal is lost at the boundary between the different programs and the picture is completely disturbed.

On the other hand, a video recorder which has recently been developed employs a pilot signal which is recorded through the rotary heads on each track with the video signal to identify the track. However, the video recorder of this type still suffers from the above-mentioned difficulty.

SUMMARY OF THE INVENTION

It is therefore an object of the invention to provide a video tape recording and reproducing apparatus which ensures stability during insert edit modes.

The present invention contemplates to exploiting the excellent tracking capability of the video tape recorder of the type wherein pilot signals are recorded on video tracks.

According to the invention, the operational mode of the rotary heads is alternately switched between playback and recording in synchronism with each half revolution of the video head cylinder. The tape is wound on the cylinder so that it extends over an arc greater than a semicircle. The video signal is recorded in a major portion of the track while the pilot signal is recorded over the full length of the track. The alternate switching of the video heads is initiated in response to an insert command signal when a desired point of a prerecorded program is reached. Because the tape extends over an arc greater than 180 degrees, when each one of the heads is recording a video signal in a major portion of a given track, the other head is operating in a playback mode while tracing a minor portion of a subsequent track where a pilot signal is present. Therefore, if one head is tracing the first track of an "insert" program, the other head is tracing that portion of subsequent track where the pilot signal of the prerecorded program is present. This pilot signal is used to generate a tracking control signal with which tape speed is controlled.

BRIEF DESCRIPTION OF THE DRAWINGS

The present invention will be described in further detail with reference to the accompanying drawings, in which:

FIG. 1, shown in separate

FIG. 5 is an illustration of a recording pattern of video, audio and pilot signals according to the invention;

FIG. 6, shown in separate

DETAILED DESCRIPTION

Figure 1A:
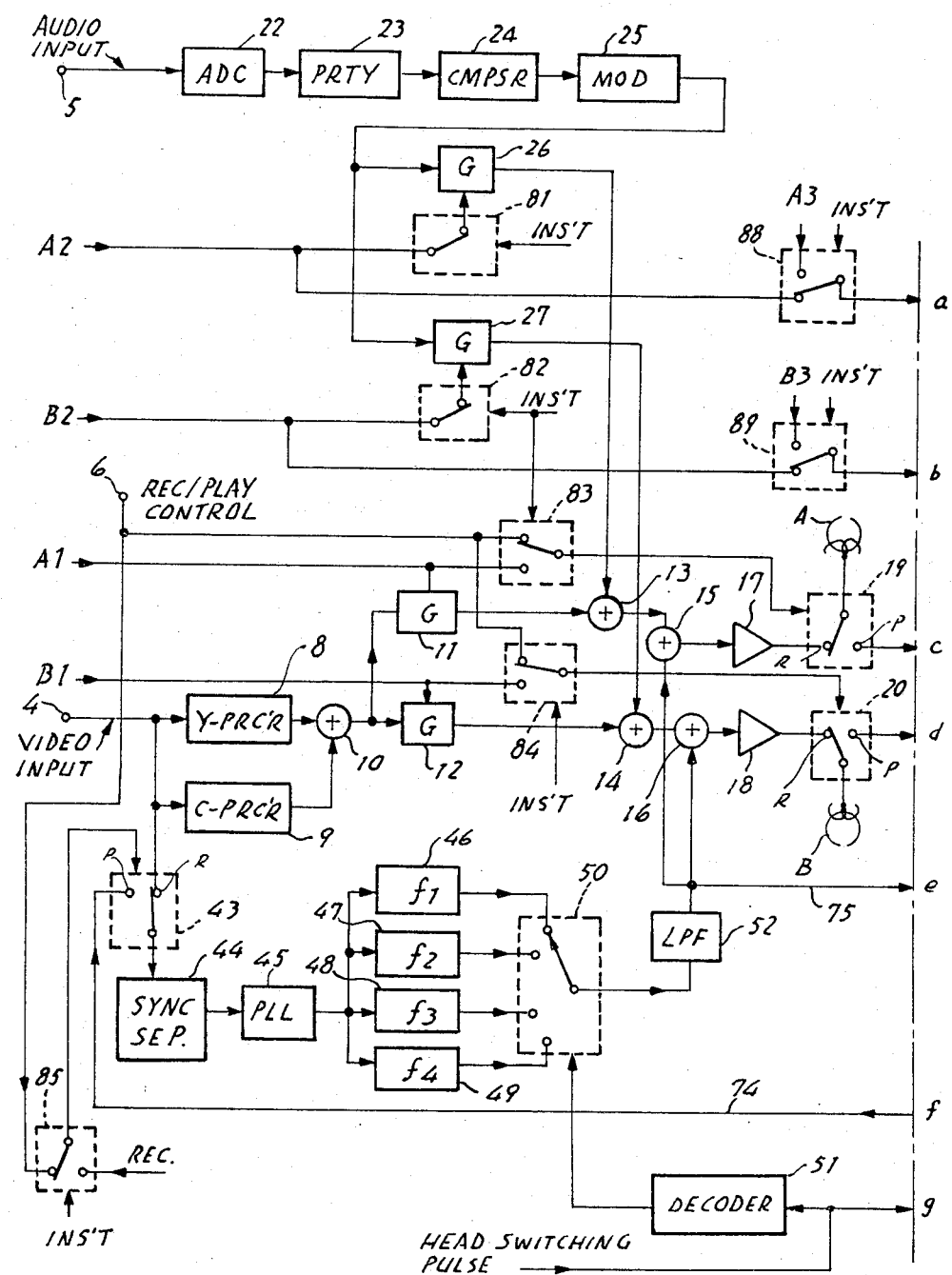
FIGS. 1a and 1b, is a block diagram of a first embodiment of the invention in which no audio signal is recorded during insert modes.
Figure 1B:
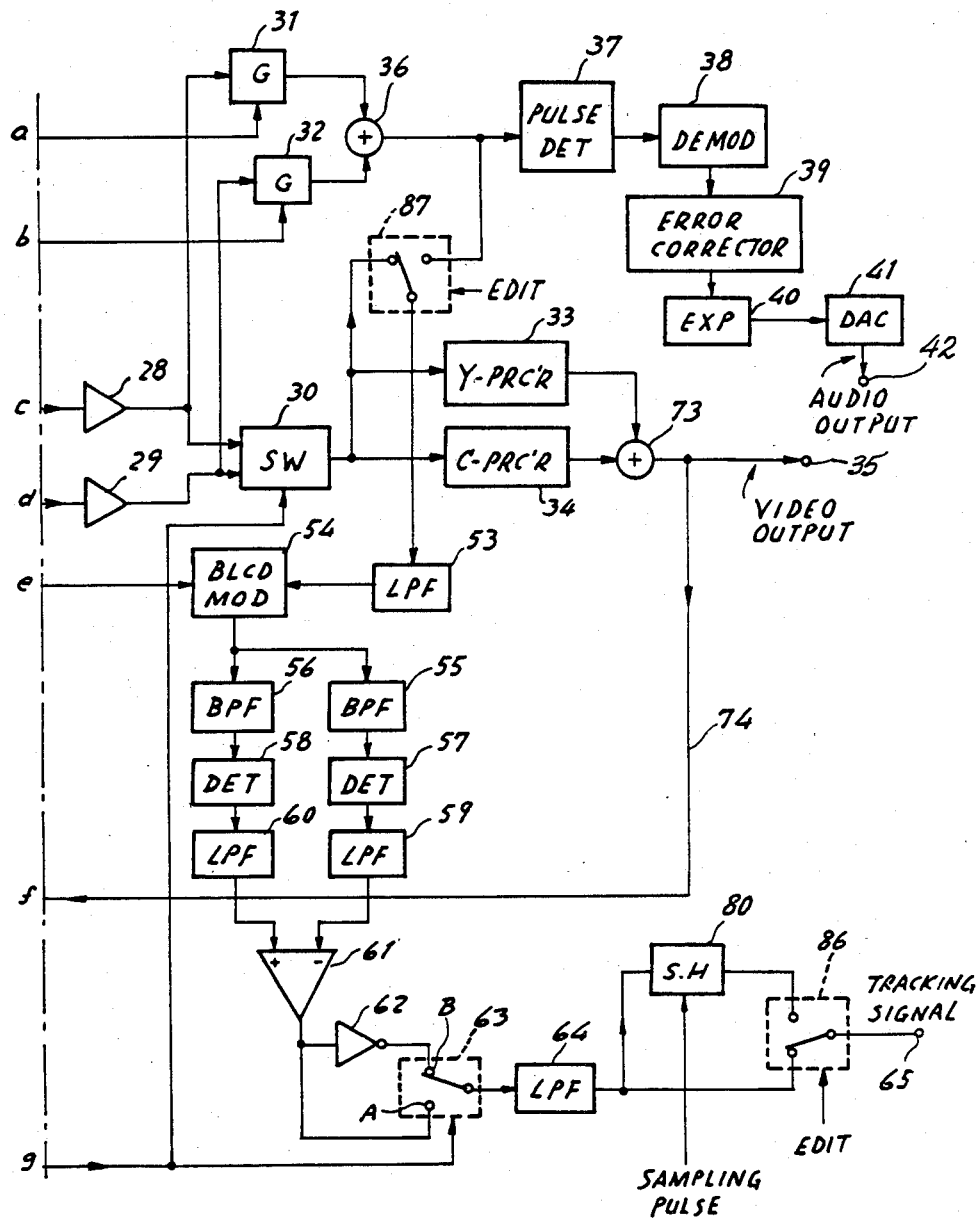

Referring now to FIGS. 1a and 1b, illustrated in separate sheets, there is shown a video tape recording/playback apparatus constructed according to a first embodiment of the invention. The apparatus includes a plurality of mode selecting switches 19, 20 and 43 having recording- and playback-mode positions marked R and P, respectively, and a plurality of "insert" mode switches 81 to 89 each having normally closed contacts in which they are positioned during normal recording and playback modes and normally open contacts in which they are positioned during insert modes. A record/playback control signal is applied from a terminal 6 through switches 83, 84, 85 to switches 19, 20, 43, respectively, to control their switched positions.

Figure 2:
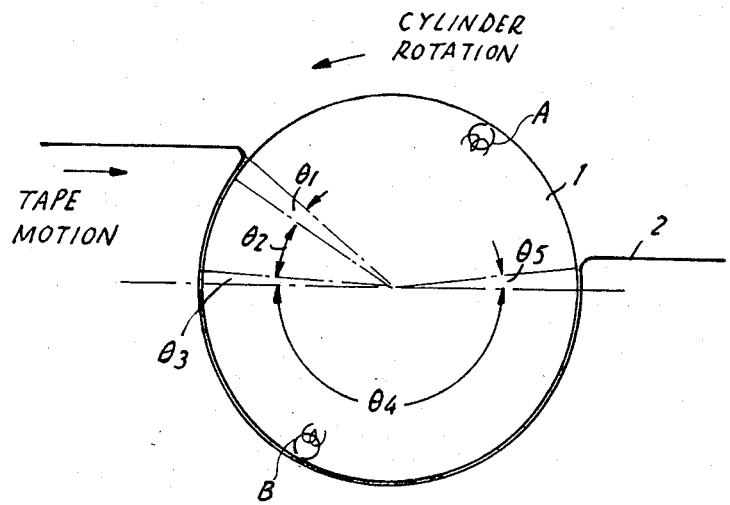
FIG. 2 is a schematic illustration of a rotary cylinder with a videotape being shown looped around the cylinder according to the invention.
Figure 3:
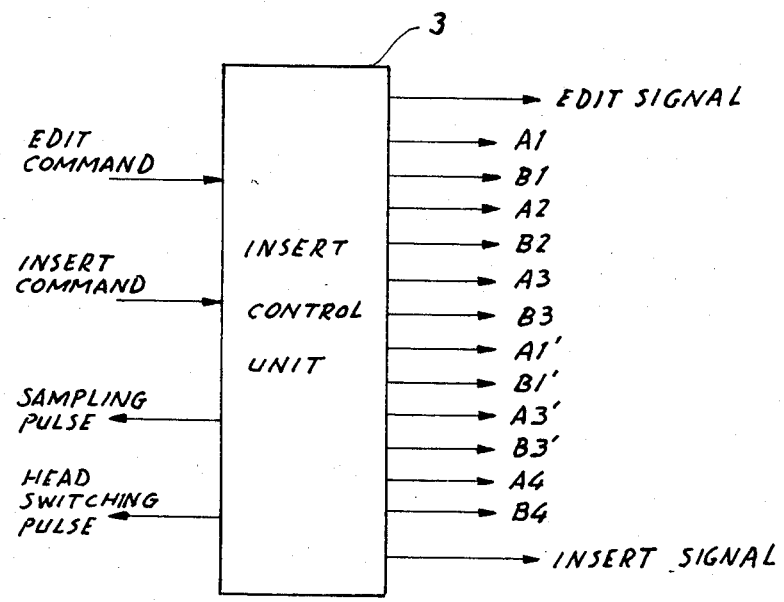
FIG. 3 is a block diagram of an insert control unit which provides various timing and control signals during insert edit modes.

In FIG. 2, video transducer heads A and B are mounted diametrically opposite each other on a rotary cylinder 1 which spins at high speeds about an axis tilted to the direction of movement of a videotape 2. The tape 2 is wound on that portion of the cylinder 1 that extends over an arc greater than 180 degrees as shown in FIG. 2 so that the video heads A and B are simultaneously brought into contact with the tape 2. Video and audio signals are recorded on that area of tape 2 that contacts the cylinder 1 and the extent of this contact area defines the length of the recording track. As illustrated in FIG. 2, this contact area, or track, is divided into five angular sections designated $\theta_1$ to $\theta_5$, with $\theta_4$ being equal to 180 degrees where the video signal of a field interval is recorded. The angular sections $\theta_3$ and $\theta_5$ are overlapping areas where video signals of adjacent fields are recorded. The angular sections $\theta_1$ and $\theta_2$ are areas where a preamble code and a digitized audio signal are respectively recorded. For operating the circuit of FIG. 1 an insert control circuit 3 is included, which, as schematically shown in FIG. 3, receives an edit command signal and an insert command signal and generates an edit signal, an insert signal, various gating pulses A1-A4, B1-B4, A1', A3', B1' and B3', and pulses for switching the video heads and sampling the tracking control signal for storage.

A composite color video signal, applied at an input terminal 4, is fed to a luminance or Y-signal processor 8 and a chrominance processor 9. The luminance component of the input video signal is frequency-modulated in the processor 8 and the chrominance component is modulated upon a lower frequency carrier and multiplexed with the frequency-modulated luminance component in an adder 10 and fed to gates 11 and 12 and passed therethrough in response to gating pulses A1 and B1, respectively.

Figure 4:
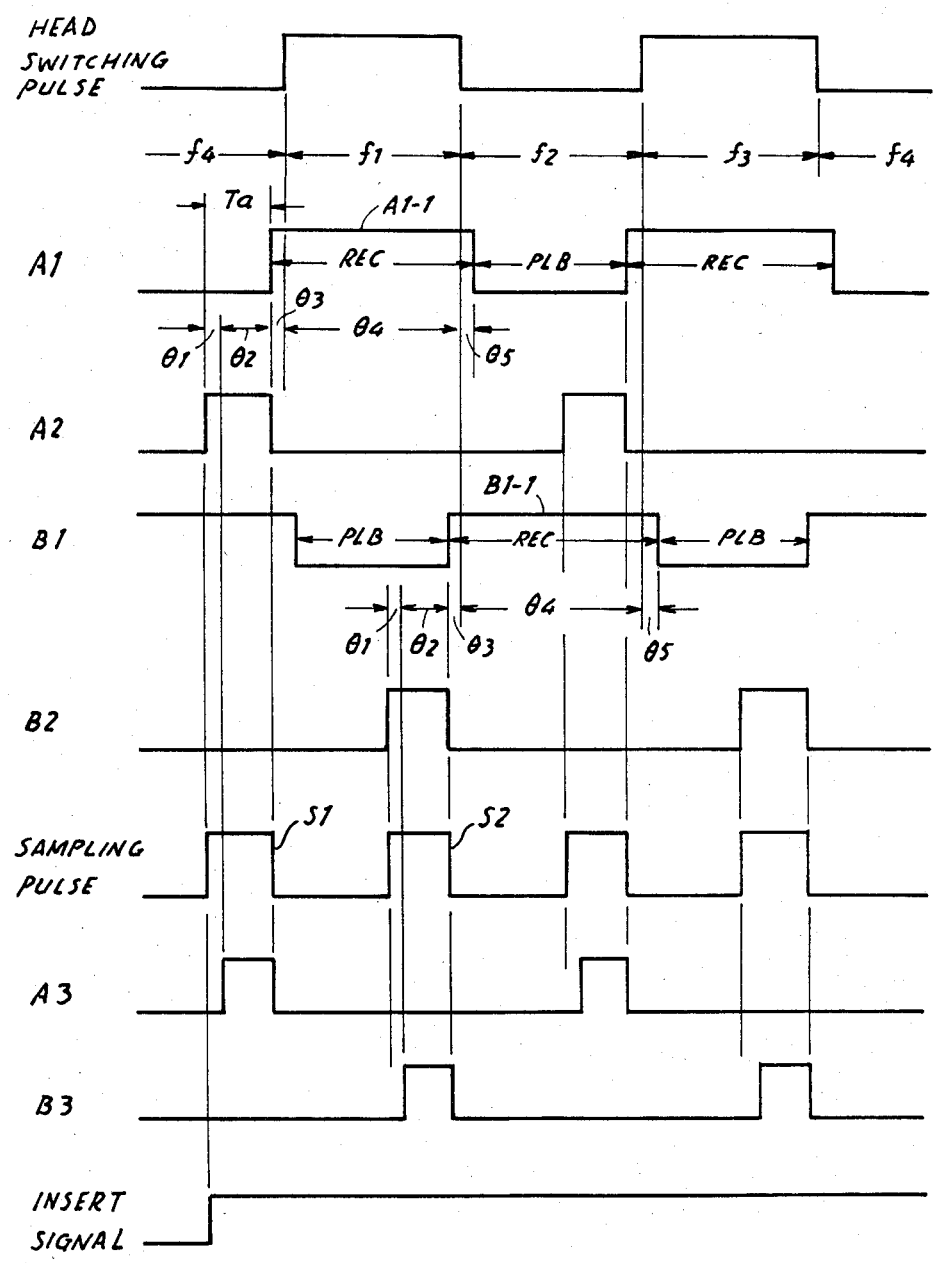
FIG. 4 is a timing diagram associated with the embodiment of FIG. 1.

As shown in FIG. 4, the gating pulses A1 and B1 are identical rectangular waveforms with a pulse duration slightly longer than the field interval of video signal so that it extends over a total angular sections $\theta3$, $\theta4$ and $\theta5$, but are shifted in phase with each other by one field interval.

An audio input signal, applied to an input terminal 5, is converted to a digital signal by an encoding circuit 20 which includes an analog-to-digital converter 22, a parity generator 23, a compressor 24 and a modulator 25. The AD converter 22 samples the audio signal at a rate of two samples per picture line period and translates the sampled value into a 10-bit code. A parity bit or bits are added to the 10-bit code in the parity generator 23. The compressor 24 has a pair of identical read/write memories addressed alternately to write the digitized audio information in response to the field interval, or half revolution of the cylinder 1 and addressed alternately to read the stored information at a rate which is typically 20 times higher than the writing rate so that the digitized audio signal is compressed with respect to time axis into a group of closely spaced pulses, or digital sample. The digital sample is modulated upon a carrier using a known modified frequency modulation technique which reduces the amount of the dc component to make the signal suitable for recording on magnetic tapes.

The modulated digital sample is applied to gates 26 and 27 and passes therethrough in resonse to gating pulses A2 and B2 which are applied through insert mode switches 81 and 82, respectively, to adders 13 and 14 during normal recording modes. The gating pulses A2 and B2 have a duration equal to a total of $\theta1$ and $\theta2$ as shown in FIG. 4, and a phase difference of one field interval relative to each other. The trailing edges of the pulses A2 and B2 coincide with the leading edges of the gating pulses A1 and B1. The total duration of pulses A1 and A2 equals the amount of time the video head A takes to scan along each of a plurality of oblique tracks marked a in FIG. 5. Similarly, the total duration of pulses B1 and B2 equals the amount of time the video head B takes to scan along each of tracks b which appear alternately with and closely spaced from the tracks a.

During recording modes, the digital sample is passed alternately through gates 26 and 27 and combined with the multiplexed luminance and chrominance signals. The combined video and audio signals are further combined with pilot signals.

The pilot signals are derived from a circuit including a sync separator 44, a phase-locked loop 45 and freqeuncy dividers 46 to 49, an electronic rotary switch 50, an address decoder 51 and a low-pass filter 52. The sync separator 44 takes its input through the mode select switch 43 from the video input terminal 4 to extract and feed horizontal sync pulses to the phase-locked loop 45 where the line frequency is multiplied by an integer N and phase-locked at a frequency $N \times f_H$, where $f_H$ represents the line frequency. The multiplied line frequency is divided by dividers 46 to 49 to generate a set of four pilot signals having frequencies $f_1 (=6.5\ f_H)$, $f_2 (=7.5\ f_H)$, $f_3 (=10.5\ f_H)$ and $f_4 (=9.5\ f_H)$. The decoder 51 derives a binary switching signal from the head switching pulse, which is generated at each half revolution of the video heads, and applies it to the rotary switch 50 to sequentially feed the pilot signals $f_1$ to $f_4$ through the low-pass filter 52 to adders 15 and 16 to be combined with the outputs of the adders 13 and 14, respectively.

The outputs of the adders 15 and 16 are fed through recording amplifiers 17 and 18 to the video heads A and B through mode select switches 19 and 20. Pilot signals $f_1$ to $f_4$ are sequentially recorded on tracks a and b respectively by heads A and B as shown in FIG. 5.

During playback modes, the recorded information is derived alternately from heads A and B and intensified by playback amplifiers 28 and 29 (FIG. 1b). The outputs of the amplifiers 28 and 29 are applied to gates 31 and 32 and passed to an adder 36 in response to gating pulses A3 and B3, respectively, each having a duration $\theta2$ as shown in FIG. 4 so that the audio information recorded on the track segment $\theta2$ is extracted. The digital signal from the adder 36 is processed by a pulse detector 37 into a signal having sharply defined edges and the necessary discrete levels for decoding. A demodulator 38 converts the output of the pulse detector 37 into a non-return-to-zero (NRZ) signal which is fed to an error collector 39 and thence to a time expansion circuit 40 whose function is to expand the time axis of the compressed signal by writing the signal alternately into one of two memories and reading the stored information at a rate reciprocal to the compression ratio. The time-expanded digital signal is applied to a digital-to-analog converter 41 to recover the original analog audio signal, which is delivered to audio output 42.

The outputs of the amplifiers 28 and 29 are also applied to an electronic switch 30 which responds to head switching pulses by alternately coupling the sequentially detected video signals to luminance and chrominance proccessors 33 and 34 whose outputs are combined in an adder 73 and delivered on the one hand to an output terminal 35 and on the other hand through a line 74 and the playback position of the mode selecting switch 43 to the sync separator 44 to serve as a source of reference pilot signals. The reference pilot signals $f_1$ to $f_4$ are generated as in recording modes and supplied from low-pass filter 52 through a line 75 to the first input of a balanced modulator 54.

The output of the switch 30 is further coupled through an "insert mode" switch 87 to a low-pass filter 53 which passes the signals having a frequency lower than $10.5\ f_H$ to extract the pilot signals detected from the videotape. Therefore, the pilot signals $f_1$, $f_2$, $f_3$ and $f_4$ are derived cyclically in this order from the low-pass filter 53. This cyclic sequence of pilot signals is applied to the second input of the balanced modulator 54.

Tracking control operation now commences. It is noted from FIG. 5 that there is a frequency difference $f_H$ between pilot signals derived from the $\theta4$ areas of tracks a1 and b1, while there is a frequency difference $3f_H$ between pilot signals derived from the $\theta4$ areas of tracks b1 and a2. Therefore, for any given track a there is a frequency difference $3f_H$ with respect to its leftside track and there is a frequency difference $f_H$ with respect to its rightside track. However, in respect of tracks b there is a frequency difference $f_H$ with respect to their leftside and there is a frequency difference $3f_H$ with respect to their rightside track.

Pilot signals on adjacent tracks are also picked up by video heads with a lesser magnitude than that derived from the center track and fed to the low-pass filter 53. If the frequency of the reproduced pilot signal coincides with a reference frequency supplied from the low-pass filter 52, the balanced modulator 54 will generate two signals having beat frequencies $f_H$ and $3f_H$ which are detected respectively by band-pass filters 55 and 56 and detectors 57 and 58. Low-pass filters 59 and 60 extract the dc components of the signals from the detectors 57, 58, the dc components being applied to a differential amplifier 61 to detect the relative magnitude of the two beat frequency signals. If the head laterally deviates from a given track, one of the beat frequency signals becomes greater than the other and the differential amplifier 61 generates a corresponding differential output, or tracking control signal. The tracking control signal is applied on the one hand to the A position of an electronic switch 63 and on the other through an inverter 62 to the B position of the switch 63. The switch 63 responds to a head switching pulse by coupling its output to the A position when the head A is tracing a track a and coupling it to the B position when the head B is on a track b. The inverter 63 reverses the polarity of the differential signal whenever it is derived from tracks b since their beat frequency relationships are in reverse to those of tracks a as described above.

High frequency components of the tracking signal are eliminated by a low-pass filter 64 whose output is coupled through "insert mode switch" 86 to a tracking control terminal 65.

When inserting material into a prerecorded videotape, an edit command signal is applied to the control unit 3 and the apparatus is first operated on edit mode which is essentially similar to normal playback mode. The apparatus is in synchronism with an external source, or second video tape recorder, and edit-mode switches 86 and 87 are operated in response to an edit signal supplied from the control unit 3. The operation of switch 87 causes a tracking signal to be derived from the signal on track areas $\theta 2$, rather than from track areas $\theta 4$, and as described below is eventually fed to a sample-and-hold circuit 80. This sample-and-hold circuit 80 is responsive to sampling pulses (FIG. 4) from the control unit 3 to sample the tracking signal derived from the audio portion of each track and store it until the end of the track. The output of the sample-and-hold 80 is coupled through the edit-mode switch 86 to the tracking control terminal 65 to control the speed of tape motion.

With the apparatus being operated on the above-mentioned edit mode, the user, viewing a television monitor, issues an insert command signal to the control unit 3 to provide an "insert" signal, FIG. 4, to switches 81-85, 88 and 89 when a desired point is reached in the displayed prerecorded program. The operation of switches 81 and 82 disables the digital audio signals from the external source to leave the prerecorded audio signals undisturbed. The switch 85 applies a record mode signal to the switch 43 to bring the pilot signal into a phase-locked condition with the horizontal sync of the insert program. The operation of switches 88 and 89 causes gating pulses A3 and B3 to be applied to gates 31 and 32, respectively, instead of gating pulses A2 and B2.

During a period Ta between the leading edge of an insert signal and the leading edge of a gating pulse A1-1, the head A is still in the playback mode tracing the leading portion of the first track of an insert area. The signal detected by head A during the period Ta is fed through amplifier 28, gate 31, adder 36, switch 87 and low-pass filter 53 to the balanced modulator 54. Since the switch 43 is in the recording postion by application of a record mode potential from switch 85, the sync separator 44 receives the insert video signal from terminal 4. The gating pulse A3 applied to gate 31 is to exclude the preamble for the digital audio signal which might also be detected so that the latter is not decoded into an analog signal. The output of the phase-locked loop 45 is thus brought into phase with the input video signal and applied through low-pass filter 52 to the balanced modulator 54. A tracking control signal is thus derived from the period Ta and sampled in response to a sampling pulse S1 and stored in sample-and-hold 80. Gating pulse A1-1 is now applied at the end of period Ta through switch 83 to mode select switch 19, instead of the record/playback control signal, so that the video head A is switched to recording mode when it starts tracing the regions $\theta 3$, $\theta 4$ and $\theta 5$ of the first track.

As the head A approaches the trailing portion of the first track, the head B, operating as a playback head, starts tracing the leading portion of the second track to pick up the pilot signal which is sampled in response to a sampling pulse S2.

The pilot signals are sequentially recorded during the periods of the pulses A1-1 and B1-1. Since the record/playback switches 19, 20 remains connected to the recording position as long as the duration of the gating pulses A1 and B1, the pilot signals are recorded only in the regions where the video signal is recorded as shown by the hatching in FIG. 5.

When the insert command signal ceases, the apparatus will return to the normal playback mode. Since the pilot signal recorded in the insert program is continuous with the pilot signal recorded in the prerecorded program, the insert program can be terminated at any point without causing interruption.

Figure 6A:
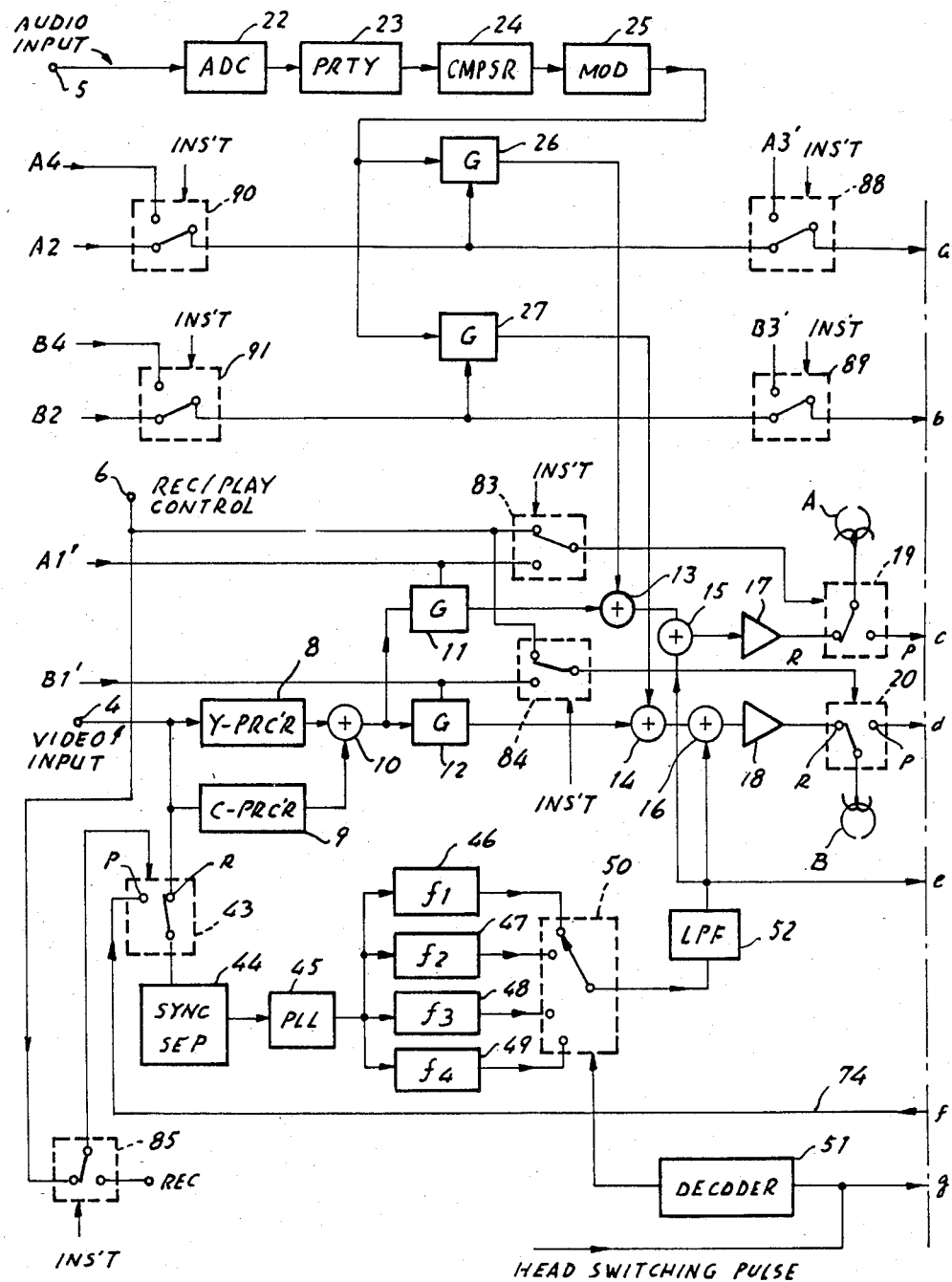
FIGS. 6a and 6b, is a block diagram of a second embodiment of the invention.
Figure 6B:
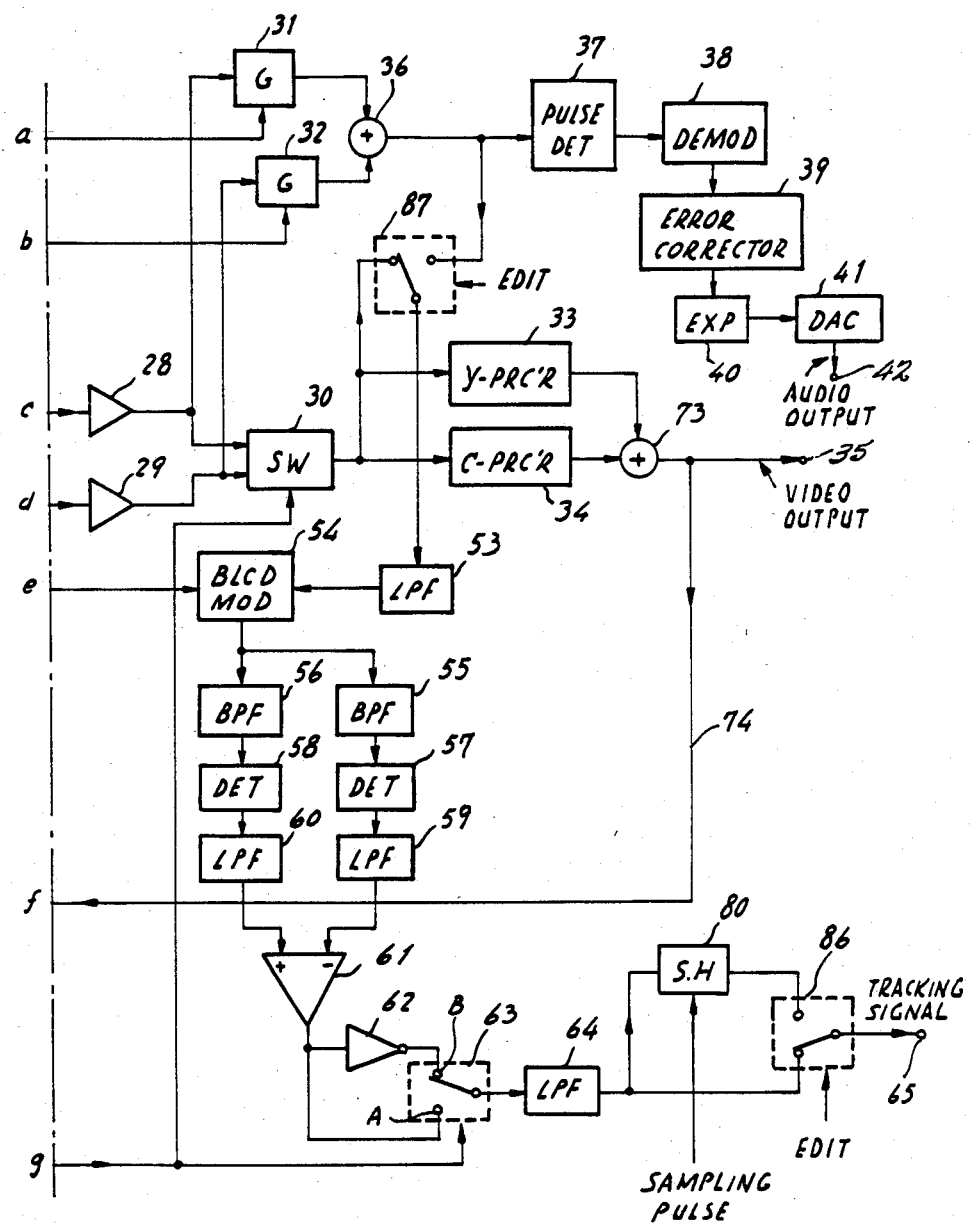
Figure 7:
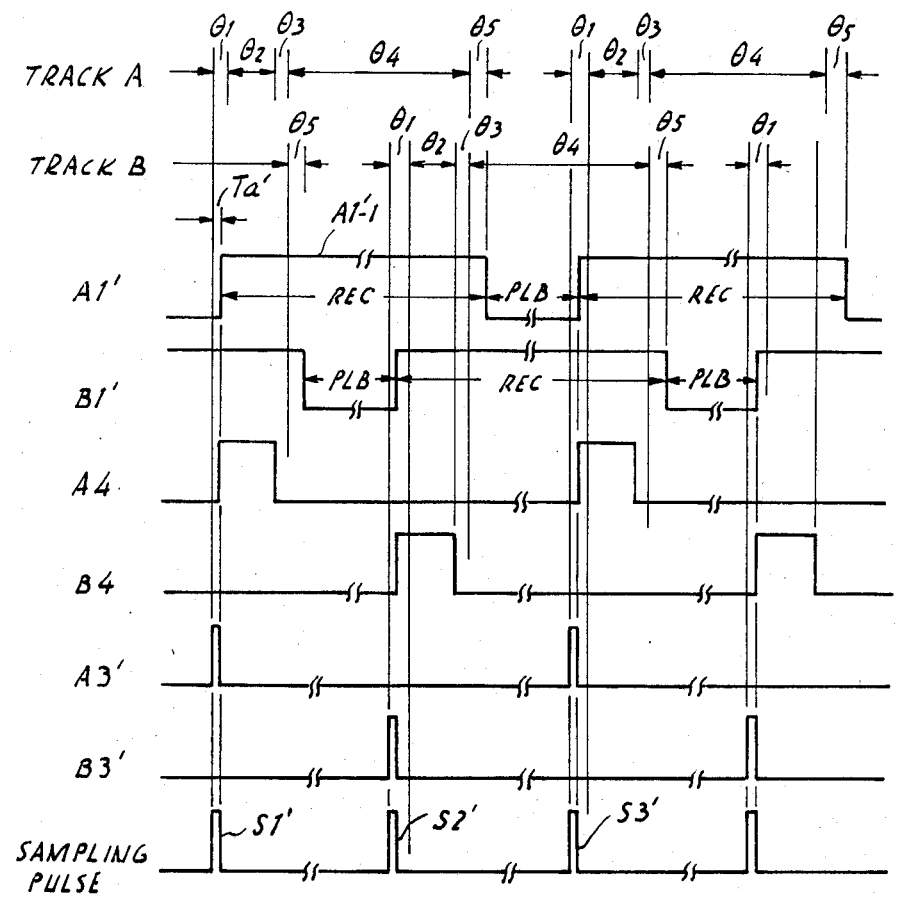
FIG. 7 is a timing diagram associated with the embodiment of FIG. 6.

In the embodiment of FIG. 1 the audio signal is not recorded in the insert program. However, under certan circumstances it is desirable to record a new audio signal to replace or superimpose on the prerecorded audio signal. To this end an embodiment shown in FIG. 6 is provided which is generally similar to that shown in FIG. 1 except that electronic switches 90 and 91 are provided instead of switches 81 and 82 to selectively couple gating pulses A2, B2, A4 and B4 to gates 26 and 27. The operation of the circuit of FIG. 6, will be visualized with reference to a timing diagram shown in FIG. 7.

Normal playback and recording modes are exactly like the previous embodiment. During edit modes, switches 86 and 87 are operated as in the previous embodiment. In response to an insert command signal switches 90 and 91 are operated to couple gating pulses A4 and B4 to gates 26 and 27. The compressed digitized audio signal is applied through gates 26 and 27 to adders 13 and 14 and alternately combined with video signals. Switches 83 and 84 are also operated to couple gating pulses A1' and B1'. Each of gating pulses A1' and B1' lasts for a period less than the total angle of $\theta 1$ to $\theta 5$ by Ta' in which no information is usually recorded. Each of the gating pulses A4 and B4 has a duration smaller than the total angle of $\theta 1$ and $\theta 2$ by Ta'. On the other hand, gating pulses A3' and B3' and the sampling pulses each have a duration Ta'.

During the period Ta' the head A remains in the playback mode to detect a pilot signal prerecorded in the no-signal portion of the track area θ1. This pilot signal is applied through amplifier 28, gate 31, adder 36, switch 87 and low-pass filter 53 to the balanced modulator 54 and modulated on the reference pilot signal from the low-pass filter 52. The differential amplifier 61 provides a corresponding tracking control signal which is sampled in response to a sampling pulse S1' and stored in the sample-and-hold 80. In response to a gating pulse A1'-1, the video head A is switched from the playback mode to the recording mode. The digitized audio signal from gate 26 is recorded over the track area θ2 of the first track of the insert program. When the head A is tracing the trailing portion of this first track, the head B picks up the pilot signal recorded in the no-signal portion of the area θ1 of the second track, this pilot signal being sampled in response to a sampling pulse S2' and stored until the occurrence of the next sampling pulse S3'. The head B is then switched to the recording mode in response to a gating pulse B1'-1 to record the audio and video signals on the second track.

If the audio signal is frequency division multiplexed with the video signal and recorded on the same region of oblique tracks, or recorded on a separate track, the circuit of FIG. 1 could be employed equally well. In this case, the track segments θ1, θ2 and θ3 are combined into a first overlap region θ6 having a length equal to that of the segment θ5.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A video tape recording and reproducing apparatus comprising a pair of transducer heads mounted in diametrically opposite positions of the circumference of a rotary cylinder rotatable about an axis tilted with respect to the direction of motion of a magnetic tape to provide recording of a video signal on and detecting the video signal from parallel tracks inclined obliquely to the length of the tape, said tape being wound on an arcuate extent greater than a semicircle of said cylinder so that when one of said heads is tracing a major portion of a given track the other head is tracing a minor portion of a subsequent track, means for generating and recording a different pilot signal on the major portion of each said track simultaneously with said video signal and on the minor portion of a subsequent track, means for deriving a tracking control signal from the pilot signal detected by the transducer heads, and means for initially operating said transducer heads in playback mode and subsequently alternating the operating modes of the transducer heads between playback and recording in synchronism with each half revolution of said cylinder to record an insert program on the major portion of a track through one of the heads and cause said tracking signal generating means to respond to the output of the other head by deriving said tracking control signal from the minor portion of a subsequent track.

2. A video tape recording and reproducing apparatus having recording, playback and edit modes, comprising:
a pair of first and second transducer heads mounted on diametrically opposite positions of the circumference of a rotary cylinder arranged to rotate about an axis tilted with respect to the direction of movement of a magnetic tape, said tape engaging the cylinder over an arcuate extent greater than a semicircle of the cylinder so that said transducer heads alternately produce a record of parallel oblique tracks of a length greater than said semicircle;
mode switching means for causing both of said transducer heads to operate as recording transducers during said recording mode and causing both of said transducer heads to operate as playback transducers during said playback mode;
pilot signal generating means effective during said recording mode for deriving a different pilot signal in synchronism with each half revolution of said cylinder and applying said pilot signal to said transducer heads operating as recording transducers and effective during said playback mode for deriving said pilot signals from a signal detected by said transducer heads operating as playback transducers;
tracking signal generating means for deriving a tracking control signal from said pilot signal generating means and from each of said heads operating as a playback transducer;
means responsive to said edit mode for alternating the operating mode of said first transducer head between recording and playback transducers in synchronism with each half revolution of said cylinder and alternating the operating mode of said second transducer head in opposite relation to said first transducer head so that when the first transducer head is operating as a recording transducer tracing a major portion of a given track the second transducer head is operating as a playback transducer tracing a subsequent track to cause said tracking signal generating means to derive a tracking signal from a minor portion of said adjacent track; and
means for storing said tracking signal derived from said portion during the major portion of said subsequent track.

3. An apparatus as claimed in claim 2, wherein said alternating means comprises:
pulse generating means for generating a first and a second series of gating pulses having a duration greater than the period of a half revolution of said cylinder but smaller than a full revolution of the cylinder, the gating pulses of said first series occurring alternately with the gating pulses of said second series; and
means for causing said first and second transducer heads to alternately record the input video signal of an insert program on a major portion of each said track in response to the gating pulses of said first and second series and causing said first and second transducer heads to alternately detect a pilot signal from a minor portion of said track during the interval between succesive gating pulses.

4. An apparatus as claimed in claim 3, wherein the duration of said gating pulses of each of said first and second series substantially equals the field interval of said video signal, wherein said pulse generating means is arranged to further generate a third and a fourth series of gating pulses having a duration much smaller than said field interval, the gating pulses of the third and fourth series occurring at mutually exclusive times and continuously with the gating pulses of said first and second series, respectively, further comprising:

means for converting an audio signal into a series of time-compressed digital samples, and means for applying each of said digital samples to said first and second transducer heads in response to the gating pulses of said third and fourth series, respectively, to record each digital sample in said minor portion during said recording mode; and means for disabling said applying means during said edit mode.

5. An apparatus as claimed in claim 3, wherein the duration of said gating pulses of each of said first and second series substantially equals the field interval of said video signal plus an extra interval, and wherein said pulse generating means is arranged to further generate a third and a fourth series of gating pulses having a duration substantially equal to said extra interval, the gating pulses of the third and fourth series occurring at mutually exclusive times and overlapping with the gating pulses of said first and second series, respectively, and a fifth and a six series of gating pulses occurring at mutually exclusive times and continuously with the gating pulses of said first and second series, respectively, further comprising:

means for converting an audio signal into a series of time-compressed digital samples and appending a preamble code to each digital sample;

means for applying said preamble code and each of said digital samples to said first and second transducer heads in response to the gating pulses of said third and fourth series, respectively, to record each preamble code and each digital sample in said minor portion during said recording and edit modes; and means responsive to said edit mode for applying signals detected by said first and second transducer heads to said tracking signal generating means in response to the gating pulses of said fifth and sixth series, respectively.

6. An apparatus as claimed in claim 2, wherein said pilot signal generating means comprises means for deriving a recurrent series of pilot signals of different frequencies in synchronism with each half revolution of said cylinder from an input video signal and applying said recurrent pilot signals to said transducer heads during said recording and edit modes and deriving said pilot signals from signals detected by said transducer heads during said playback mode, and wherein said tracking signal generating means comprises means for detecting beat frequencies between a pilot signal recorded on a given track and each of adjacent pilot signals recorded on tracks located on opposite sides of said given track and generating therefrom a pair of beat frequency signals, and means for detecting the difference between said beat frequency signals as an indication of a deviation of said transducer heads laterally from said given track.

7. An apparatus as claimed in claim 6, wherein said beat frequency detecting means comprises a balanced modulator having a first input responsive to pilot signals detected by said transducer heads and a second input responsive to said pilot signals generated by said pilot signal generating means and a pair of band-pass filters connected to the output of said balanced modulator to detect said beat frequency signals.

* * * * *